US006367597B1

(12) United States Patent
De Vries et al.

(10) Patent No.: US 6,367,597 B1
(45) Date of Patent: Apr. 9, 2002

(54) ELECTRIC ACTUATOR WITH CONTROL SENSOR, AND DISC BRAKE COMPRISING SUCH ACTUATOR

(75) Inventors: Alexander Jan Carel De Vries, Tiel; Armin Herbert Emil August Olschewski; Hendrikus Jan Kapaan, both of Nieuwegein; Johannes Albertus Van Winden, Oudewater, all of (NL); Clair Druet, Drumettaz Clarafond (FR); Thomas Müller, Essleben (DE)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/462,256

(22) PCT Filed: Jul. 10, 1998

(86) PCT No.: PCT/NL98/00402

§ 371 Date: Feb. 9, 2000

§ 102(e) Date: Feb. 9, 2000

(87) PCT Pub. No.: WO96/41970

PCT Pub. Date: Dec. 27, 1996

(30) Foreign Application Priority Data

Jul. 10, 1997 (NL) .............................................. 1006540

(51) Int. Cl.[7] .............................................. F16D 65/38
(52) U.S. Cl. ................................. 188/196 V; 188/71.9
(58) Field of Search ............... 188/72.1, 72.8, 188/71.9, 71.8, 196 V

(56) References Cited

U.S. PATENT DOCUMENTS

| 4,579,012 A | | 4/1986 | Mabie et al. | |
|---|---|---|---|---|
| 4,602,702 A | | 7/1986 | Ohta et al. | |
| 5,090,518 A | * | 2/1992 | Schenk et al. | 188/72.1 |
| 6,000,507 A | * | 12/1999 | Bohm et al. | 188/158 |
| 6,040,665 A | * | 3/2000 | Shirai et al. | 188/158 |

FOREIGN PATENT DOCUMENTS

| DE | 195 21 401 C 1 | | 1/1997 |
|---|---|---|---|
| DE | 195 36 694 A 1 | | 4/1997 |
| EP | 0 170 478 A2 | | 2/1986 |
| JP | 07144636 | * | 6/1995 |
| WO | WO 96/41970 | | 12/1996 |

* cited by examiner

*Primary Examiner*—Christopher P. Schwartz
*Assistant Examiner*—Robert A. Siconolfi
(74) *Attorney, Agent, or Firm*—Oliff & Berridge PLC

(57) ABSTRACT

An electric actuator (1) comprises a housing (2) which contains a screw mechanism (3) and an electric motor (4) which is driveably connected to the screw mechanism (3), said screw mechanism (3) providing a linear movement in a rotational movement of the electric motor (4) and comprising a screw (17) and a nut (18), one of which is supported with respect to the housing (2), a sensor (28) being provided for measuring a quantity related to the rotational movement and/or the linear movement of the screw mechanism (3). A control unit (29) for monitoring and/or influencing the rotational and/or the linear movement of the screw mechanism (3) on the basis of signals from the sensor (28) has been provided.

11 Claims, 2 Drawing Sheets

ELECTRIC ACTUATOR WITH CONTROL SENSOR, AND DISC BRAKE COMPRISING SUCH ACTUATOR

Figure 1:
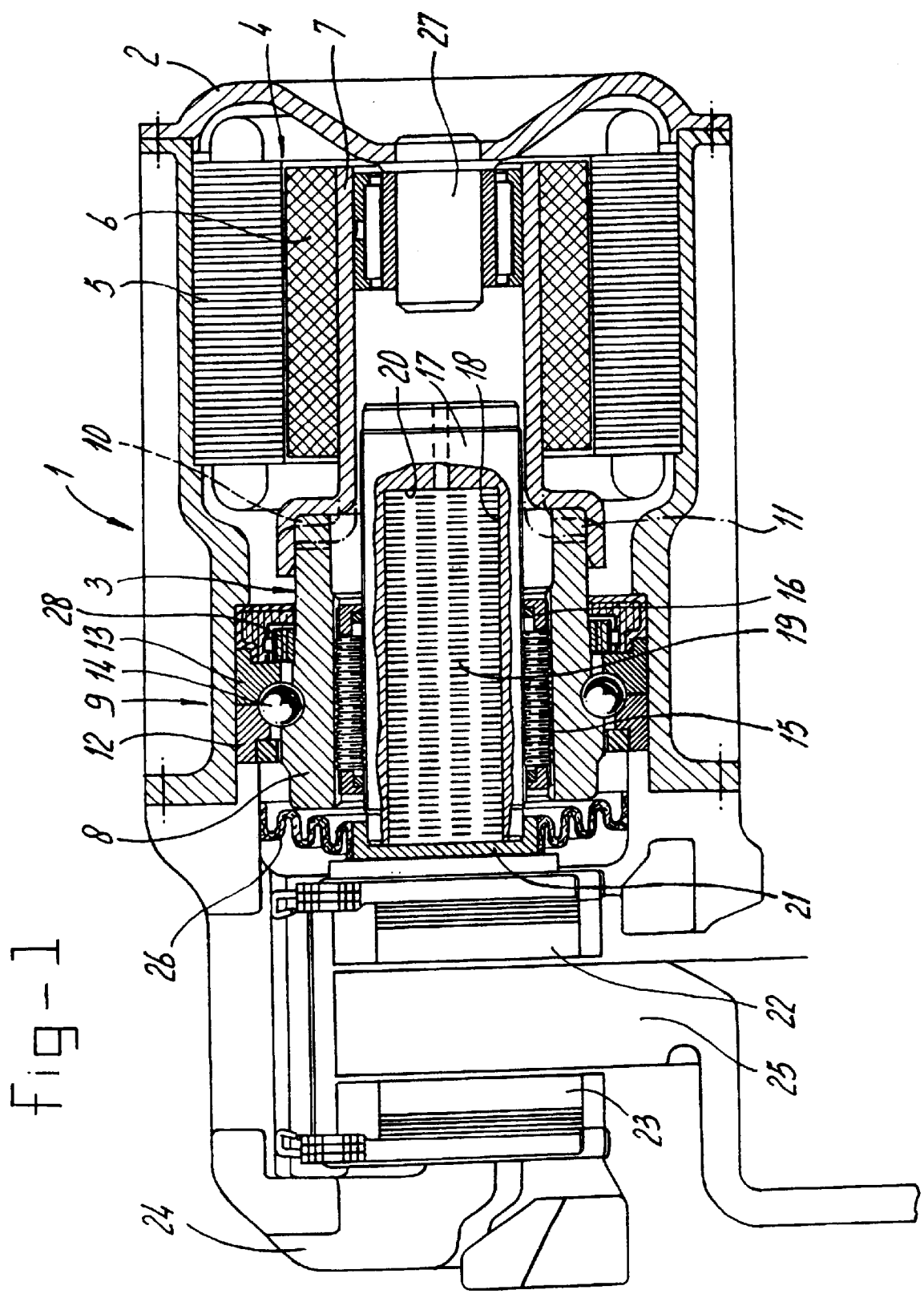

The invention is related to an electric actuator comprising a housing which contains a screw mechanism and an electric motor which is driveably connected to the screw mechanism, said screw mechanism providing a linear movement in response to a rotational movement of the electric motor and comprising a screw and a nut which is supported with respect to the housing, a sensor being provided for measuring a quantity related to the rotational movement and/or the linear movement of the screw mechanism.

Such electric actuator is known from WO-A-9403301. The electric motor of this actuator rotates a screw mechanism, which exerts a clamping force on the brake pads of a disc brake. In order to provide a fine tuning of the brake force, it is important to control the rotation of the screw mechanism accurately. Also, it is desired to control the screw mechanism for compensating brake pad wear which occurs in service in a disc brake.

The object of the invention is therefore to provide an electric actuator of the type described before, which allows a full control of the screw mechanism for all kinds of driving conditions and purposes, e.g. anti-theft. This object is achieved by means of a control unit for influencing the rotational and/or the linear movement of the screw mechanism on the basis of signals from the sensor.

As the control unit is continuously fed with information about the position and number of revolutions of the screw mechanism, it will always be updated so as to control the screw mechanism in the correct way.

The sensor may have various locations. In an actuator comprising at least one bearing for supporting the screw mechanism with respect to the housing, the sensor may be connected to at least one of the bearing rings. Also, the sensor may be connected to the screw, the nut or the housing.

In case the rolling elements are accommodated in a cage, the sensor may be connected to at least the cage.

For an embodiment having a roller spindle, the rollers of which are accommodated in a roller cage, the sensor may be connected to the roller cage.

The sensor itself may take several forms as well. For instance, the sensor is an optical sensor or a magnetic position encoder, e.g. comprises a pulse ring and a part which are rotatable with respect to each other, one of the pulse ring and the other part being immovable with respect to the housing.

As mentioned before, the actuator according to the invention is preferably used in a brake calliper for a disc brake, said actuator having an electric actuator as described before, the actuator having a housing which contains a screw mechanism and an electric motor which is driveably connected to the screw mechanism, said screw mechanism providing a linear movement in response to a rotational movement of the electric motor and comprising a screw and a nut one of which is supported with respect to the housing, a yoke onto which the housing is connected, and a pair of brake pads, one of which is connected to a fixed part of the yoke, and the other of which is connected to the screw or nut of the screw mechanism.

Here as well, a control unit may be provided for having a control unit for influencing the rotational and/or the linear movement of the screw mechanism on the basis of signals from the sensor.

This sensor may serve basic functions, such as giving information about wear compensation, brake force feedback (ABS) and maintenance indication. Additionally, monitoring functions for traction control, for vehicle dynamics and anti-theft are possible.

During its lifetime the brake pads wear out and therefore become thinner. This means that the roller screw has to compensate for the abrasion, which can be up to 30 mm. However, in order to guarantee safe operation, the distance between pads and brake disc always has to be maintained at approximately 0.2 mm. This can be done with the roller screw encoder since a number of pulses represents a certain distance. During braking, the brake pad will be pressed towards the disc with a certain force. When the brake is released, the force decreases and when it moves below a certain minimum level, when the pads are still touching the disc, the pulse counter is set to zero. Now the electric motor is turned further backwards until the proper number of pulses has been counted. In case the resolution of the sensor is 400 pulses per rotation, for a roller screw lead of 1 mm, this represents 1*0.2*400=80 pulses. In this way, calibration takes place at each brake operation. An advantage for the roller screw is that the spot where the most severe forces are applied, is gradually shifting over its full length, in discrete steps of $\frac{1}{400}$th of a rotation.

In order to provide such wear compensation option, the control unit may comprise a counter for counting the number of revolutions over which the screw mechanism is rotated from a rest position to a full brake position, a memory comprising a fixed number of revolutions representing a maximum desired number of rotations from the rest position to the full brake position, a comparator for comparing the actual number of revolutions and the maximum desired number of revolutions, and resetting the rest position in case the actual number of revolutions exceeds the maximum desired number of revolutions.

Brake pad replacement can also be monitored in the brake calliper according to the invention.

In this respect, it is also possible to provide a control unit comprising a second counter for counting the total number of revolutions of the screw mechanism from a start position with unworn brake pads, up to the actual full brake position, a second memory comprising a maximum allowable number of revolutions, and a comparator for establishing whether the total number of revolutions exceeds the maximum allowable number of revolutions and for generating a warning signal indicating that maintenance is required in case the total number of revolutions exceeds the maximum allowable number of revolutions.

Furthermore, the control unit may comprise a third memory containing a set of brake characteristics data giving the brake force as a function of the number of revolutions for establishing the actual brake force on the basis of the actual number of rotations.

In the calliper described before, the displacement of the brake pads relative to each other is obtained by means of the screw mechanism. Such mechanism is fit for providing fairly large displacements, and for high loads. In a high duty cycle environment, preferably a roller spindle is used. A relatively large amount of the total travel of the screw mechanism is consumed by the flexibility of e.g. a calliper itself and by compensation displacements for accommodating for brake pad wear.

Only after removing the play as caused by structural flexibility, the brake pads start to deliver a significant braking action. The final phase of application of the brake pads onto the disc brake requires a significant torque, which might be disadvantageous having regard to installed motor power and screw thread wear.

In this respect, an improvement may be obtained in an embodiment wherein the screw mechanism engages a piezoelectric material actuation member.

In this embodiment, the screw mechanism is actuated up to a certain holding torque, for eliminating the slack or play. Subsequently, the piezoelectric material actuation member is actuated for obtaining the final braking displacement.

Preferably, the screw has a bore which opens out at the side of the associated brake pad, which bore contains a series of piezoelectric or magnetostrictive elements supported at one end at the bottom of the bore, and at the other end resting against a head which is connected to said brake pad.

The invention is furthermore related to a method for controlling a disc brake. Said method comprises the steps of counting the actual number of revolutions from a rest position to a full brake position, comparing said actual number of revolutions with a maximum desired number of revolutions, and resetting the rest position in case the actual number of revolutions exceeds the maximum desired number of revolutions for the purpose of compensating brake pad wear, as well as the step of establishing the difference between the actual number revolutions and the maximum desired number of revolutions, and using this difference for establishing a reset rest position upon resetting said rest position.

Moreover, the method for controlling the brake calliper may comprise the steps of counting the actual number of revolutions of the screw mechanism from a start position with unworn brake pads, up to the actual full brake position, comparing said actual number of revolutions with a maximum allowable number of revolutions, and generating a warning signal in case the total number of revolutions exceeds the maximum allowable number of revolutions for maintenance indication.

The invention will be explained further with reference to an embodiment shown in the figures.

Figure 2:
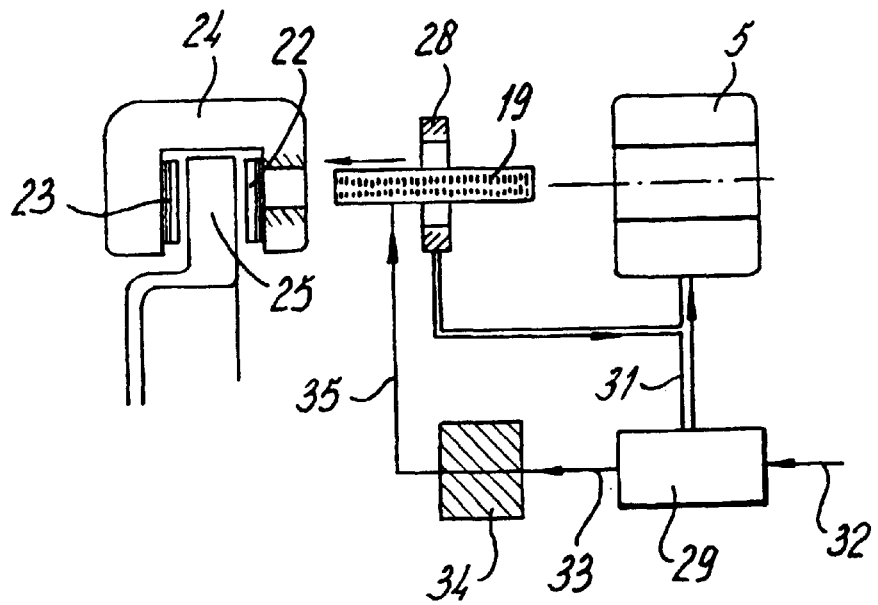
Figure 3:
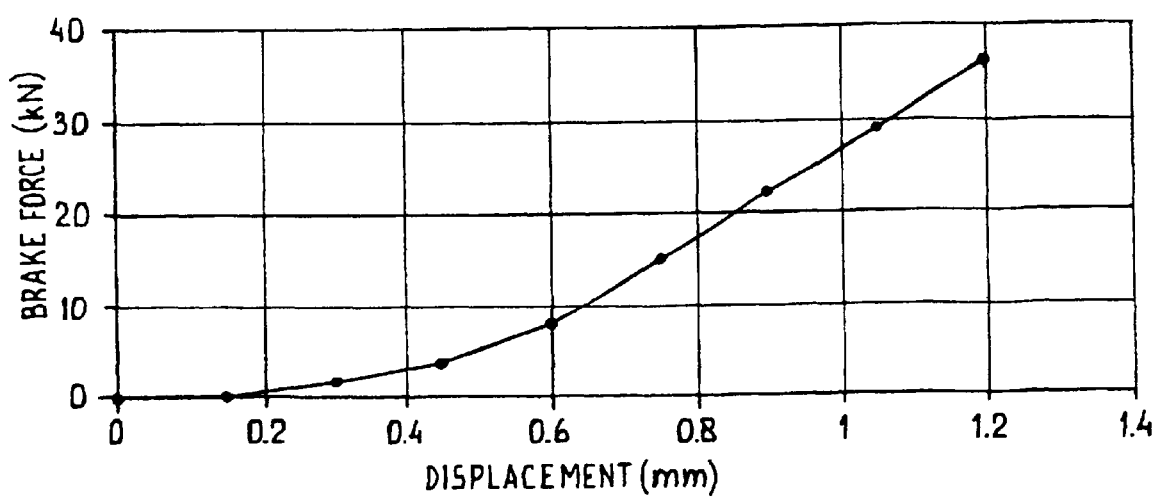

FIG. 1 shows a brake calliper according to the invention.
FIG. 2 shows a control scheme for this brake calliper.
FIG. 3 shows a graph containing brake characteristics.

The brake calliper shown in FIG. 1 comprises an actuator having a housing 2 which contains a screw mechanism 3 and an electric motor 4. The stator 5 of the electric motor 4 is connected to the housing, the rotatable part 6 of the motor is connected to a support piece 7 which is connected to inner ring 8 of four-point contact ball bearing 9. This inner ring has indentations 10, into which protrusions 11 of the support piece 7 are connected.

The angular contact ball bearing furthermore has an outer ring comprising two ring halves 12, 13, and a single series of balls 14. Preferably, angular contact ball bearing 9 is a full complement ball bearing, so as to provide a maximum axial bearing capacity. Its working lines defined each by a pair of contact points are non-symmetric so as to improve even further the bearing capacity.

Screw mechanism 3 is a roller screw mechanism, and has a nut 8 (which is integral with the inner ring 8 of the four-point contact ball bearing 9), a series of rollers 15 contained in a roller cage 16, and a screw 17. This screw has a bore 18, which contains a series of piezoelectric elements 19. The series of piezoelectric elements 19 abuts at one end the bottom 20 of the bore 18, and at the other end a head 21 which engages a brake pad 22.

The other brake pad 23 is connected to a fixed part 24 of the brake calliper. The brake pads 22, 23 enclose a brake disc 25. The internal space of the actuator 3 at one end is closed off by means of a bellows 26 connected to the head 21, and at the other hand by a needle bearing 27 supporting the support piece 7.

Between the integrated inner bearing ring/nut 8 and the housing 1, a ring sensor 28 has been applied for sensing the rotational movements of the screw mechanism 9.

The brake calliper according to the invention furthermore contains a control unit 29, as shown in FIG. 2, the function of which is as follows.

The control unit 29 receives information, via line 31, from the sensor about the rotations of the screw mechanism, and thereby about the axial displacement of the screw 17. Furthermore, via line 31 the control unit controls the electric motor 4, in response to brake signals from the brake pedal, arriving via line 32.

Also, via line 33, control unit 29 controls the electric current source 34, which energizes the piezoelectric elements 19 via line 35.

The control unit 29, upon receiving a control signal 32 from the brake pedal, first of all energizes motor 4 so as to displace the screw mechanism. After a predetermined displacement of the screw mechanism, which is mainly intended for bringing the brake pads 22, 23 into contact with the brake disc 25 and for taking the flexibility out of the brake calliper, the electric motor 4 is stopped and held energized so as to block the screw mechanism.

Subsequently, for the final movement up to full braking power, the piezoelectric elements 19 are energized, and deliver a maximum displacement of 0.2 mm. Thereby, full braking power is obtained by both displacements caused by the screw mechanism 3, as well as by the piezoelectric elements 19.

The graph shown in FIG. 3 comprises brake characteristics data, wherein the brake force is indicated along the vertical axis, and the actuator displacement along the horizontal axis. This characteristic data set is contained in the brake calliper control unit. Upon providing a signal from a brake pedal to said control unit, a corresponding brake force is picked. The corresponding displacement is subsequently read from the graph, and then the actuator is driven over the corresponding number of rotations, so as to provide the desired braking effect.

What is claimed is:

1. A brake calliper for a disc brake, comprising:

an electric actuator, the actuator having a housing which contains a screw mechanism and an electric motor which is driveably connected to the screw mechanism, the screw mechanism providing a linear movement in response to a rotational movement of the electric motor and comprising a screw and a nut, one of the screw and nut which is supported with respect to the housing, a yoke onto which the housing is connected, a first brake pad connected to a fixed part of the yoke, and a second brake pad connected to the screw or nut of the screw mechanism, and a control unit for monitoring and/or influencing the rotational and/or the linear movement of the screw mechanism on the basis of signals from the sensor, wherein the control unit comprises a counter for counting a number of revolutions over which the screw mechanism is rotated from a rest position to a full brake position, a memory comprising a fixed number of revolutions representing a maximum desired number of rotations from the rest position to the full brake position, a comparator for comparing the actual number of revolutions and the maximum desired number of revolutions, and a reset device for resetting the rest position in case the actual number of revolutions exceeds the maximum desired number of revolutions for the purpose of compensating brake pad wear such that resetting occurs as the number of revolutions represents a predetermined amount of brake pad wear.

2. The brake calliper according to claim 1, wherein the control unit comprises a second counter for counting the total number of revolutions of the screw mechanism from a start position with unworn brake pads, up to the actual full brake position, a second memory comprising a maximum allowable number of revolutions, and a comparator for establishing whether the total number of revolutions exceeds the maximum allowable number of revolutions and for generating a warning signal in case the total number of revolutions exceeds the maximum allowable number of revolutions for maintenance indication.

3. The brake calliper according to claim 1, wherein the control unit comprises a second memory containing a set of brake characteristics data giving the brake force as a function of the number of revolutions for establishing the actual brake force on the basis of the actual number of rotations.

4. The brake calliper according to claim 1, wherein the control unit comprises an input for brake signals from a brake pedal.

5. The brake calliper according to claim 1, wherein the screw mechanism engages a piezoelectric or magnetostrictive actuation member.

6. The brake calliper according to claim 5, wherein the screw has a bore which opens out at the side of the second brake pad, which bore contains a series of piezoelectric elements supported at one end at the bottom of the bore, and at the other end resting against a head which is connected to the second brake pad.

7. The brake calliper according to claim 5, wherein the control unit is programmed for initially energizing the electric motor for at least partly applying a brake force, and for subsequently energizing the piezoelectric actuation member for attaining a nominal braking force while maintaining the electric motor energized.

8. A method for controlling a brake calliper according to claim 1, comprising the steps of:

counting the actual number of revolutions from a rest position to a full brake position, comparing the actual number of revolutions with a maximum desired number of revolutions, and resetting the rest position when the actual number of revolutions exceeds the maximum desired number of revolutions for the purpose of compensating brake pad wear.

9. The method according to claim 8, further comprising the steps of:

establishing the difference between the actual number of revolutions and the maximum desired number of revolutions, and using the difference to establish a reset rest position upon resetting the rest position.

10. A method for controlling a brake calliper according to claim 2, comprising the steps of:

counting the actual number of revolutions of the screw mechanism from a start position with unworn brake pads, up to the actual full brake position, comparing the actual number of revolutions with a maximum allowable number of revolutions, and generating a warning signal when the total number of revolutions exceeds the maximum allowable number of revolutions for maintenance indication.

11. A method for controlling a brake calliper according to claim 3, comprising the steps of:

providing a signal related to a desired braking effect, the signal emanating from a brake pedal, establishing the braking force required for the desired braking effect, obtaining the required number of revolutions from the second memory, and driving the actuator the required number of revolutions.

* * * * *